Jan. 6, 1959  S. L. ADELSON  2,867,233
LIQUID LEVEL CONTROL SYSTEM
Filed July 15, 1954  2 Sheets-Sheet 1

Jan. 6, 1959

S. L. ADELSON 2,867,233

LIQUID LEVEL CONTROL SYSTEM

Filed July 15, 1954

United States Patent Office 2,867,233
Patented Jan. 6, 1959

2,867,233

LIQUID LEVEL CONTROL SYSTEM

Samuel L. Adelson, Tucson, Ariz., assignor to Infilco Incorporated, Tucson, Ariz., a corporation of Delaware Application July 15, 1954, Serial No. 443,636

19 Claims. (Cl. 137—413)

This invention relates to apparatus for sensitive control of the liquid level in liquid holding basins.

It is an object of this invention to provide an apparatus for maintaining the liquid level in a basin at a predetermined elevation regardless of the pressure variations in the liquid inlet line to the basin.

Another object is to provide an apparatus for maintaining a predetermined liquid level in a basin regardless of the variations in the discharge of liquid from the basin.

Another object is to provide an apparatus for maintaining a constant head over a liquid discharge means.

A further object of the invention is to provide novel means for transmitting the movements of the piston of a hydraulic cylinder to a device responsive to said movements.

Another object of the invention is to provide simple means utilizing the movement of the piston of a hydraulic cylinder operating a valve to prevent over-travel of said valve.

Other objects will become apparent upon consideration of the following detailed description and the claims.

Where a device is to be used for the purpose of maintaining a constant head over an orifice in a liquid holding basin, so that the discharge through the orifice is substantially constant, the ordinary float-operated valve in the liquid supply line to the basin is not satisfactory. It is apparent that the level of the liquid in the basin or container must vary with the degree of opening of the valve. The degree of opening of a float-operated valve depends on the pressure variations in the liquid supply line and the change made in the net area of the orifice to vary the demand for liquid discharge. Any change in the liquid level will obviously change the head over the orifice, and consequently the discharge through the orifice for a given area will not be constant.

In my invention I provide means for maintaining the liquid level in the basin substantially constant regardless of the variations in the pressure in the liquid supply line and the area of the discharge orifice, or both. These means may take various forms and may be in part mechanically and in part pneumatically operated.

The invention will be more readily understood by reference to the drawings, wherein like reference characters designate similar elements and wherein.

Figure 1:
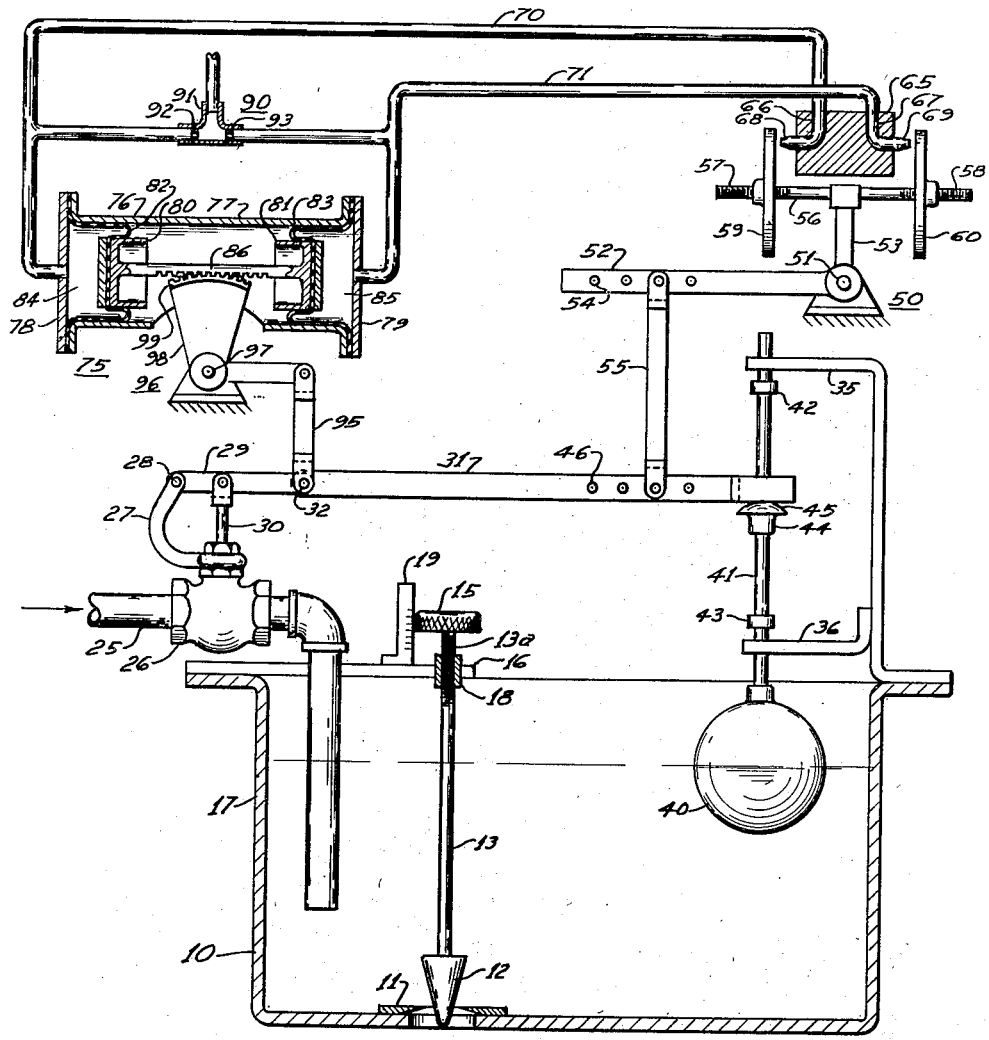
Figure 1 is a diagrammatic elevational view, partially in section, of one embodiment of the invention.

The embodiment shown in Figure 1 is well-suited for relatively small basins.

The liquid holding basin 10 of Figure 1 has an outlet, shown for purposes of exemplification as an orifice disc 11 in the bottom of the basin. A properly formed plug 12 is adapted to enter the orifice 11 to vary its effective area. A stem 13 is connected to the plug 12 at one end, its other end 13a being threaded and having a knob 15 affixed thereto. A bracket 16 is fixed to a basin wall 17 by any suitable means, not shown, and supports a threaded nut 18, which engages the threaded end 13a of the stem 13. A dial 19 is fixed to the bracket 16 adjacent the knob 15, and is suitably calibrated so that the effective area of the orifice 11 may be determined by observing where the top of the knob 15 registers with the markings on the dial 19.

Liquid is supplied to the basin 10 through an inlet conduit 25 provided with a valve 26. The valve 26 may be of the type which is ordinarily float and lever operated and where upward movement of the valve stem increases the valve opening, and vice versa, downward movement decreases the valve opening. To the body of valve 26 is rigidly affixed a bracket 27 at one end of which is a fulcrum 28 for a lever 29. The stem 30 of valve 26 is pivotably connected to the lever 29 intermediate its ends, so that as the free end of the lever 29 is raised or lowered the stem 30 also is raised or lowered. A lever 31 is pivotably connected at 32 to the free end of the lever 29.

Supported from the basin 10 are brackets 35 and 36, as shown. A float 40 has a stem 41 guided for up and down movement by suitable openings in brackets 35 and 36. Collars 42 and 43 are adjustably fixed to the stem 41 of float 40 to limit the upward and downward movement of the float 40. Also adjustably fixed to the stem 41 is a collar 44 having a rounded upper face 45. The free end of lever 31 is bifurcated and rests on the face 45. The lever 31 is also provided with a series of spaced holes 46.

A bell crank 50 is fulcrumed at 51 and has two arms 52 and 53. The arm 52 of bell crank 50 has a series of spaced holes 54 corresponding to the holes 46 in the lever 31. A link 55 is pivoted at one end to one of the holes 46 in the lever 31, while the other end of the link 55 is pivoted in the corresponding hole 54 in the arm 52. Fixed to the other arm 53 of the bell crank 50 is a rod 56. The end portions 57 and 58 of rod 56 are threaded and carry valve discs 59 and 60, respectively, which are adjustable along the respective end portions.

Located between the discs 59 and 60 is an escapement control housing 65 which may be fixed in position, as shown, by any suitable means, not illustrated. The housing 65 has air passageways 66 and 67, provided with constrictive outlets 68 and 69, respectively, located adjacent, and normally spaced from, the opposing faces of discs 59 and 60, respectively. The air passageways 66 and 67 in housing 65 are connected through air lines 70 and 71, respectively, to opposite air pressure chambers of a double piston air motor 75. The air motor comprises a housing 76 including a central section 77 and two end sections or caps 78 and 79 which may be clamped to the opposed ends of the central section. A pair of opposed pistons 80 and 81 are sealed to the central section 77 by rolling type diaphragms 82 and 83, thus forming in the opposed ends of the housing airtight pressure chambers 84 and 85, respectively. The pistons 80 and 81 are rigidly connected by a rack 86.

The air lines 70 and 71 are connected to a source of air under pressure through an orifice supply fitting 90 including a main inlet port 91 and two restricting orifices 92 and 93 of equal area, through which air is conveyed from the port 91 to the air lines 70 and 71, respectively.

The air motor 75 is linked to the valve 26 and to the float-operated control mechanism as follows: A link 95 is pivotally connected to the free end of lever 29 and of lever 31. The free end of link 95 is pivoted to the end of one arm of a bell crank 96 which is fulcrumed at 97. The other arm 98 of bell crank 96 is shaped as a toothed sector 99 which meshes with the rack 86 of air motor 75.

The operation of the invention will be readily understood.

Liquid enters the basin 10 through the inlet supply line 25 and is discharged from the basin 10 through the orifice 11. The location of the liquid level in the basin 10 is predetermined and the desired rate of discharge through the orifice is set by adjusting the top of the knob 15 on stem 13 with respect to the dial 19, to position the plug 12 with respect to the orifice 11.

The depth to which the float 40 will be immersed in the liquid will depend upon the diameter and weight of the float 40, the weight of the stem 41 and its collars 42, 43 and 44, and of the parts supported from collar 44. The movement of the float 40 is not affected or impeded by these weights which affect only the depth to which it is immersed. The only work that the float 40 is required to do as the liquid level rises or falls is to pivotably move the bell crank 50 so as to change the position of the valve discs 59 and 60 with respect to the restrictive outlets 68 and 69 of air passageways 66 and 67, respectively.

When the liquid level is at the predetermined elevation due to the amount of liquid discharged through the orifice 11 being equal to the amount entering the basin through the inlet supply line 25, the apparatus is at equilibrium, as shown in Figure 1. At equilibrium, the gaps between the restrictive outlets 68 and 69 and the discs 59 and 60, respectively, are equal. Therefore, the pressure in the chambers 84 and 85 of the air motor 75 are equal and accordingly the forces on the piston 80 and 81 are equal and there is no movement of the pistons and the rack 86. The valve 26, therefore, remains in its then position.

When the pressure in the inlet supply line 25 upstream of the valve 26 increases, more liquid will enter the basin 10 and the liquid level will rise above the predetermined elevation. The float 40 will rise almost instantaneously with the rise in liquid level, as there is practically no resistance to its free movement. As the float 40 rises, the collar 44 on the stem 41 also rises and will raise the bifurcated end of the lever 31, the other end of lever 31 pivoting about the pivot point 32. At the same time the link 55 will move upward, causing the bell crank 50 to rotate clockwise about its fulcrum 51 and to move the disc 59 closer to the opening 68 of passageway 66 and the disc 60 farther away from the opening 69 of passageway 67. This reduces the gap between disc 59 and opening 68 and increases the gap between disc 60 and opening 69. Since the two air passageways 66 and 67 are connected to the air pressure chambers 84 and 85 of the air motor 75, respectively, pressure will build up in chamber 84 and the pressure in chamber 85 will be reduced. With this difference in pressure in chambers 84 and 85, the pistons 80 and 81 and their associated rack 86 will move to the right, as seen in Figure 1, that is, in the direction of the chamber 85 of lower pressure. When the rack 86 moves to the right, it rotates the bell crank 96 through the toothed sector 99 in a clockwise direction about its fulcrum 97, thereby moving the link 95 downwardly and lowering the free end of the lever 29 to move the stem 30 of the valve 26 in valve closing direction.

At the same time as the link 95 moves downwardly, the lever 31 also will move downwardly with the rounded top 45 of the collar 44 acting as a fulcrum. The link 55 will follow the downward movement of the lever 31, causing the bell crank 50 to rotate counterclockwise about its fulcrum 51 to move the disc 59 away from restrictive outlet 68 and the disc 60 closer to restrictive outlet 69.

When the gaps between discs 59 and 60 and outlets 68 and 69, respectively, are equal, the pressures in the chambers 84 and 85 of air motor 75 equalize, and movement of the pistons 80 and 81 and their associated rack 86 ceases, thereby preventing further movement of the stem 30 of valve 26 in valve closing direction.

The valve 26 remains in the position where its decreased opening compensates for the increased pressure in the inlet supply line, thereby maintaining a constant liquid discharge into the basin and in turn a constant liquid level.

The above cycle will similarly occur if the net effective area of the orifice 11 is decreased.

The reverse operation occurs when there is an increase in the net effective area of the orifice 11 or a decrease in the liquid supply pressure, or both.

A test made using a tank approximately fourteen inches in diameter showed a variation of one-sixteenth inch of the liquid level when the area of the orifice was suddenly changed from the equivalent of one-half inch in diameter to the equivalent of three-sixteenth inches in diameter. Appreciable pressure changes had approximately the same effect on the liquid level.

Figure 2:
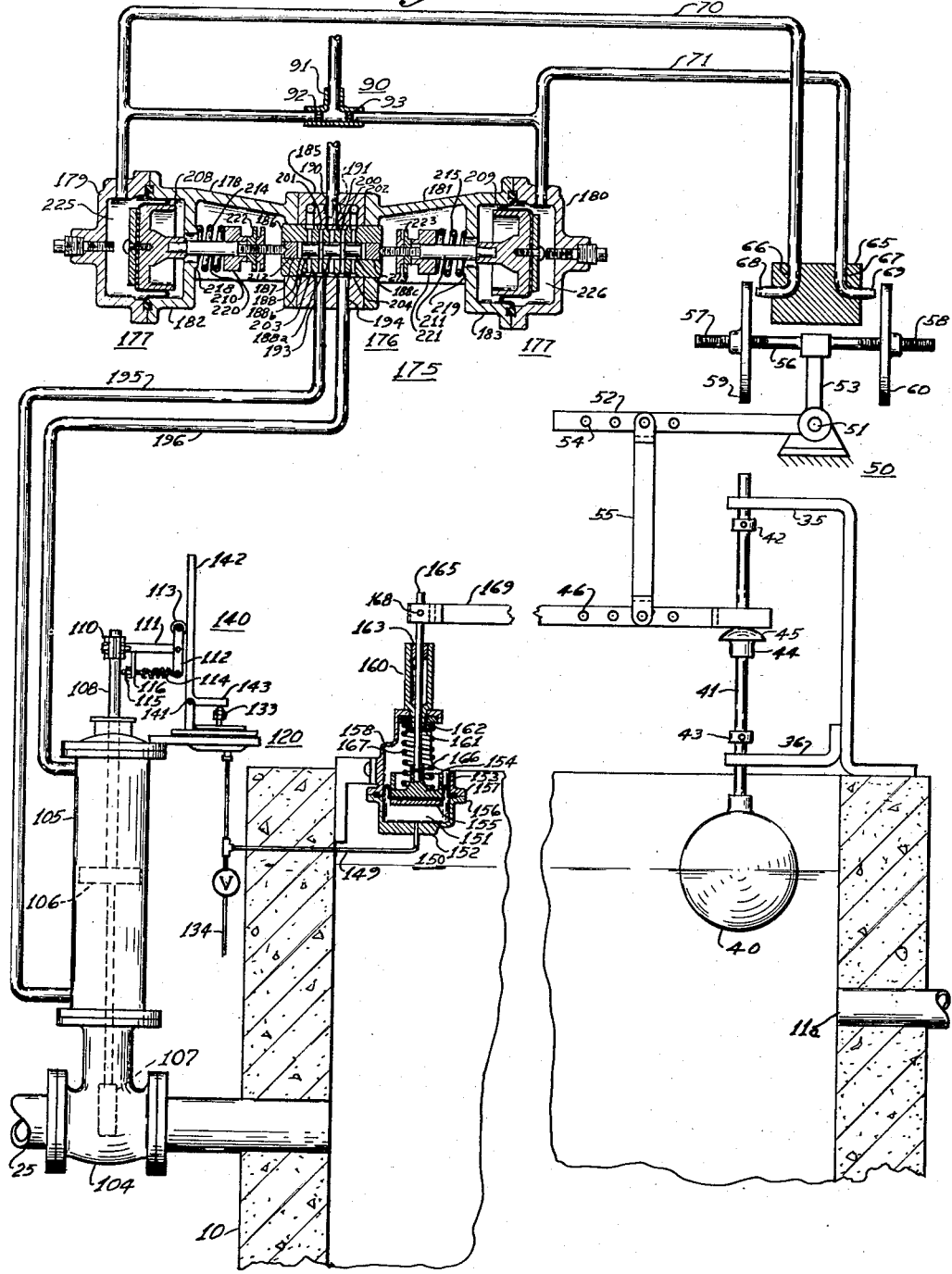
Figure 2 is a diagrammatic elevational view, partially in section, of another embodiment of the invention.

The embodiment of Figure 2 is particularly suited for, though not limited to, large basins, where the flow rates of incoming and outgoing liquid are such as to require the use of large hydraulically-operated valves instead of the smaller valve shown in Figure 1.

Since the inlet valve of Figure 2 is operated by means of a hydraulic cylinder, the air motor of this embodiment does not position the inlet valve through mechanical linkage, but positions a pilot valve which controls the flow of operating liquid to and from the hydraulic cylinder. The float, the air escapement device, and the parts connecting the air escapement device to the float and to the air motor are the same as described in connection with Figure 1. However, while in the embodiment of Figure 1 the control mechanism is reset to neutral position by the linkage which effects the correcting movement of the inlet valve, in the embodiment of Figure 2 the movements of the piston of the hydraulic cylinder which positions the inlet valve are converted to a corresponding air pressure which is utilized for resetting the control mechanism to neutral position.

The liquid holding basin 10 of Figure 2 has an inlet supply line 25 and an outlet 11a.

A valve 104 controls flow through the inlet supply line 25. This valve 104 may be of the hydraulically-operated type, such as a gate valve, which has a hydraulic cylinder 105, including a piston 106 which is connected to the gate 107 of the valve 104. The piston 106 has a tail rod 108. As the valve opening increases, the tail rod 108 of the hydraulic cylinder rises, and vice versa, as it decreases, the tail rod falls.

Adustably fixed to the tail rod 108 of the hydraulic valve 104 is a clamp 110. One end of an arm 111 is fixed to the clamp 110, and the other end pivotably supports a lever 112 intermediate its ends, as shown. A roller 113 is rotatably mounted at one end of the lever 112. A spring 114 is affixed to the other end of the lever 112 at one end and with its other end to an adjusting screw 115, threaded into a lug 116 fixed to the arm 111. The tension of the spring 114 is set by moving the adjusting screw 115 with respect to the lug 116. The spring force is transmitted to the roller 113 through the lever 112.

Figure 3:
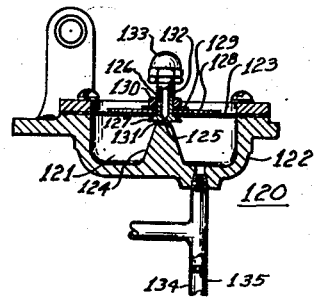
Figure 3 is a vertical sectional view, on an enlarged scale, of a detail of Figure 2.

An air escapement valve 120, shown in detail in Figure 3, may be supported by any suitable means, for example, as shown in Figure 2, from the hydraulic cylinder 105. The air escapement valve 120 has a chamber 121 formed by a casing 122 and a resilient diaphragm 123. The casing 122 has a raised portion 124 having a flat face 125. An externally threaded air nozzle 126 extends through the diaphragm 123 and has an enlargement 127 at one end. A clamping plate 128, washer 129, and jamb nut 130 hold the air nozzle in place. The nozzle 126 has an air inlet 131 above the raised portion 124 and air outlets 132. Threaded to the free end of the nozzle is a cap 133. Air under suitable pressure enters the chamber 121 of air escapement valve 120 through an air supply pipe 134 having a restriction 135.

Interposed between the roller 113 on lever 112 and the cap 133 is a bell crank 140, fulcrumed at 141. The roller 113 is in contact with the arm 142 of the bell crank 140, and the cap 133 is in contact with the arm 143. Thus, a force is applied to the cap 133 whose value depends upon the force with which spring 114 causes roller 113 to press against the arm 142 and the distance of the roller 113 from the fulcrum point 141 of the bell crank 140. The greater this distance at a preset spring force, the greater the force with which the arm 143 presses against the cap 133. At equilibrium the force exerted by the cap 133 on the arm 143 due to pressure in chamber 121 results in a moment which is equal and opposite to the moment due to the roller 113 pressing against the arm 142. Under these conditions a gap will exist between the air inlet 131 of the nozzle 126 and the face 125 of the raised portion 124 of casing 122 such that the air admitted to the chamber 121 through pipe 134 will escape through openings 131 and 132 as fast as it enters.

If the tail rod 108 of valve 104 should rise, then the moment due to the force of the roller 113 on arm 142 will increase and force the cap 133 downwardly to close the gap between the air inlet 131 and the face 125. Pressure will then build up in chamber 121, which will increase the force on the diaphragm 123 until the force with which the cap 133 presses against arm 143 of bell crank 140 results in a moment which again balances the moment due to roller 113 pressing against arm 142 of bell crank 140. For a downward movement of tail rod 108 the procedure will be reversed and the pressure in chamber 121 will decrease. The pressure existing in the chamber 121 is, therefore, a measure of the position of the tail rod 108 and thus of the valve. This pressure is transmitted through a branch line 149 leading from air supply pipe 134 to a device 150, which returns the float-operated control means to equilibrium position when the correcting movement of the piston 106 has been completed.

The device 150 has a chamber 151 formed by a casing 152 and a rolling type diaphragm 153. The inner edge of the diaphragm 153 is clamped between a piston 154 and a clamping plate 155 by any suitable means, not shown. The peripheral edge of the diaphragm 153 is clamped between a flange 156 of casing 152 and a flange 157 of a body 158 which is axially aligned with the casing 152. Branch line 149 communicates with the chamber 151 through an opening in the casing 152. A guide piece 160 having a threaded end 161 is secured to the body 158 by means of a nut 162 and the threaded end 161. A bushing 163 is pressed into or otherwise secured to the guide piece 160. A push rod 165 passes through bushing 163 and the guide piece 160 and is secured at its lower end to piston 154 by a pin 166. A spring 167 encircles the lower portion of the push rod 165 and is seated, and held in place between nut 162 and piston 154. The upper end of push rod 165 is adjustably affixed to a trunnion 168 by any suitable means, such as a set screw, not shown. Pivotably connected to trunnion 168 is a lever 169, which is similar to lever 31 of Figure 1 and whose free end is supported by the float 40 in the same manner as the lever 31.

As heretofore explained, when the tail rod 108 moves toward valve open position, the air pressure in the chamber 121 of air escapement valve 120, and therefore also in the chamber 151 of reset device 150, increases. For a given position of the tail rod 108 there will be a corresponding air pressure in chamber 151. When this pressure, acting on the piston 154, is sufficient to overcome the compressive force of the spring 167 and the weight of the parts carried by the piston 154, the push rod will be moved upwardly through a certain distance.

The float 40 and its associated parts, as well as the parts positioned by the float 40 and the escapement control housing 65, may be the same in the embodiment of Figure 2 as described in connection with Figure 1 and, therefore, will not be further described.

Flow of pressure fluid to the hydraulic cylinder 105 positioning valve 104 is controlled by a pneumatically-operated pilot valve assembly 175, which may take the form disclosed in co-pending application Serial No. 374,766, filed August 17, 1953.

Such a pilot valve assembly 175 has two main parts, a pilot valve 176 and a pneumatically-operated double piston valve motor 177. An instrument base or housing 178 has dished opposed end sections or caps 179 and 180, and a center section 181 with dished open ends 182 and 183 facing the end sections 179 and 180, respectively, and flanged thereto. Centrally mounted in the center section 181 of the base 178 is a valve body 185 which may be rectangular in cross section. A cylindrical sleeve 186 extends through openings in opposite side walls of the body 185 and is provided with a central bore 187, in which a valve member 188 is positionable. The valve body 185 is provided with a plurality of ports and the sleeve 186 has a plurality of passages which can be positioned to interconnect certain ports. Port 190 is centrally located in the body 185 and is adapted for connection to a source of operating fluid, not shown, and port 191 is adapted for connection to a waste line, not shown. Ports 193 and 194 are connected to pressure lines 195 and 196, respectively, which lead to the lower and upper ends of the hydraulic cylinder, respectively.

The sleeve 186 is provided with suitable passages adapted to connect the bore 187 to the several ports. A central passage 200 connects to the inlet port 190. Passages 201 and 202, located on either side of the inlet passage 200, establish connection for flow from the bore 187 to the ports 193 and 194, respectively. Passages 203 and 204 establish connection between the opposite end portions of the bore 187 and the waste port 191.

The valve member 188 fits snugly into the bore 187, and has a plurality of notches in its circumference. The notches 188a, 188b and 188c are sized and spaced in such manner that in the neutral position of valve member 188, passages 201 and 202 leading to ports 193 and 194, respectively, are separated from the inlet passage 200 and from the outlet passages 203 and 204, respectively, whereby all flow through the valve is stopped, but that pairs of passages are interconnected when the valve member 188 is moved in either direction to establish flow through the valve to and from the hydraulic cylinder, the arrangement being so that when the valve member 188 is moved from neutral position to the right, operating fluid flows to the upper end of the cylinder 105 and pressure fluid is exhausted from the opposite end of the cylinder 105, and when the valve member is moved in the opposite direction from neutral, the reverse flow occurs.

The valve motor 177 which positions the pilot valve 176 is quite similar to the air motor of Figure 1. In this embodiment, however, the pistons 208 and 209 are not strutted, as in Figure 1, but have separate piston rods 210 and 211 which extend from the pistons 208 and 209, respectively, through openings in the end portions 182 and 183, respectively, into opposed ends of the bore 187 of the pilot valve 176. The inner ends of piston rods 210 and 211 contact caps 212 and 213 fitting snugly into the bore 187 adjacent opposite sides of valve member 188, so as to be slidable in, but make a substantial leakproof contact with the wall of the bore. Springs 214 and 215 encircle the piston rods 210 and 211, respectively, and are seated with their outer ends in stationary spring seats 218 and 219, as shown, and with their inner ends in spring seats 220 and 221, respectively, which are adjustable along the threaded inner portions of piston rods 210 and 211 and are held in place by nuts 222 and 223. The nuts 222 and 223 are positioned to slightly compress the springs 214 and 215 between their seats when the system is in balance. The spring force of springs 214 and 215 is chosen so that they permit full opening of the pilot valve, and at the same time restore the valve 188 to neutral position when the pressures in chambers 225 and 226 are equal.

Air pressure lines 70 and 71 connect the piston chambers 225 and 226 with the passageways 66 and 67, respectively, of the escapement control device 65, and are connected to a source of air under suitable pressure in the same manner as described in connection with Figure 1.

The operation of the embodiment of the invention shown in Figure 2 will be readily understood.

In Figure 2 the elements of the control device are shown in the positions they assume at equilibrium, when liquid enters the basin 10 through the supply line 25 at the rate at which liquid is discharged from the basin 10 through the outlet 11a. Under these conditions the liquid level in the basin is at the predetermined elevation. Also, as explained in connection with the embodiment of Figure 1, at equilibrium the gaps between the restrictive outlets 68 and 69 and the discs 59 and 60, respectively, and the pressure in the piston chambers 225 and 226 are equal, so that the valve member 188 is in neutral position, where flow through the valve 176 is stopped.

When the rate of discharge from the basin 10 decreases, or the rate of inflow increases, the liquid level in the basin 10 rises above the predetermined elevation, and the float 40 will rise practically instantly with the rise in liquid level.

As described with reference to Figure 1, rising of the float 40 raises the lever 169 and the link 55, causing the bell crank 50 to rotate clockwise about its fulcrum 51, to move the disc 59 closer to restrictive outlet of air passageway 66, and the disc 60 further away from outlet 69 of air passageway 67, to build up the pressure in chamber 225 of valve motor 177 and reduce the pressure in chamber 226. This results in a net force acting on the pistons 208 and 209 to move them and the valve member 188 to the right, as seen in Figure 2, in opposition to the spring 215. Operating fluid is now admitted to the upper end of the cylinder 105, and pressure fluid is exhausted from the lower end of the cylinder 105 to move the valve toward the closed position to reduce the flow to the basin.

As the valve 104 moves toward the closed position, the tail rod 108 moves downwardly and the moment due to the force of roller 113 on the arm 142 of bell crank 140, and thus also the force on the cap 133 of the air escapement valve 120, decreases, whereby the gap between the air inlet of the nozzle 126 and the face 125 is increased.

As more air escapes through the nozzle 126, the pressure in chambers 121 and 151 decreases. The force of the spring 167 plus the weight of the parts on piston 154 will now overcome the upward force due to air pressure on the piston 154 and move the push rod 165 downwardly.

The result of the downward movement of push rod 165 of Figure 2 is the same as that of the downward movement of the link 95 of Figure 1. The lever 169 will move downward, with the collar 44 as a fulcrum, and with it the link 55, causing counterclockwise rotation of the bell crank 50 to restore equal values to the gaps between the discs 59 and 60, and the restrictive outlets 68 and 69, respectively. This equalizes the pressures in the piston chambers 225 and 226, whereupon the spring returns the valve member 188 to its neutral position, where flow to and from the hydraulic cylinder is cut off, to stop the movement of the valve 104. In this manner overtravel of the valve is substantially eliminated.

The reverse operation will occur when there is a decrease in the liquid level in the basin caused by a reduced pressure in the inlet supply line, or an increase in the rate of discharge from the basin, or both.

It will be obvious to those versed in the art that various modifications of the embodiments shown and described can be made without departing from the spirit and scope of the invention. It should, therefore, be understood that I do not wish to limit myself to the exact structural details shown herein for purposes of illustration and exemplification. Thus, it will be obvious to those skilled in the art that the system need not be operated by air, but that other gases can be used instead. The word "air" is used in this specification and in the claims to denote any compressible fluid.

I claim:

1. Apparatus for maintaining a substantially constant liquid level in a basin having inlet means and outlet means, and a valve controlling flow through said inlet means and having a valve-positioning element, comprising a liquid level responsive means in said basin, an air motor having opposed pressure chambers, each of said pressure chambers having a flexible wall, means adapted to supply air under pressure to said pressure chambers, means for regulating the air pressure in said pressure chambers from the movement of said liquid level responsive means, said pressures being equal when said regulating means is in its equilibrium position, and transmission means operable by movement of said flexible walls upon an unbalance of said pressures due to movement of said liquid level responsive means to move said valve-positioning element and said regulating means in accordance with the difference in the air pressures in said chambers, said liquid level responsive means being independent of the operation of said transmission means and positioned solely by changes in the liquid level in said basin.

2. A liquid level controller for a basin having liquid inlet means and liquid outlet means and a valve controlling flow through said inlet means and having a valve-positioning element, comprising a float in said basin, a first and a second air passageway, said passageways having constrictive outlets, valve discs on opposite sides of said outlets, means rigidly connecting said valve discs, said valve discs being normally equally spaced from said outlets, means for transmitting the movement of said float due to a change in the liquid level in said basin to said valve disc connecting means to move one valve disc nearer to its associated outlet and the other further away from its associated outlet, an air motor having opposed pressure chambers, said first passageway being connected to one of said chambers and said second passageway to the other pressure chamber, said passageways being adapted to be connected to a source of air under pressure, and transmission means for transmitting a pressure differential in said pressure chambers due to said valve discs being unequally spaced from said outlets to said valve-positioning element and to said means for transmitting the movement of said float to said connecting means, said float being independent of the operation of said transmission means and positioned solely by changes in the liquid level in said basin.

3. In a liquid level controller for a basin having liquid inlet means and liquid outlet means, and a valve controlling flow through said inlet means, said valve having a valve-positioning element, an air motor controlling the position of said valve-positioning element, said air motor having two pressure chambers connected to a source of air under pressure, the air pressures in said chambers at equilibrium being equal, means for bleeding air from said pressure chambers, and valve means for said air bleeding means, a float in said basin, a lever supported with one end from said float, linkage connecting said lever intermediate its ends with said valve means and positioning said valve means with respect to said bleeding means to vary the amount of back pressure in said pressure chambers in accordance with the movements of said float, and transmission means transmitting the resulting pressure differential in said air pressure chambers to said valve-positioning element and to the other end of said lever, said float being independent of the operation of said transmission means and positioned solely by changes in the liquid level in said basin.

4. Apparatus for maintaining a liquid level in a basin having liquid inlet means and liquid outlet means, and a valve controlling flow through said inlet means and having valve-positioning means, comprising a float in said basin, a first and a second air passageway, said passageways having constrictive outlets, a pair of discs mounted adjacent said outlets, said discs being connected to move in unison in such manner that one disc moves toward its outlet while the other moves away from its outlet, means for moving said discs in accordance with movements of said float due to change in the liquid level in said basin, an air motor having opposed pressure chambers, said first passageway being connected to one of said chambers and said second passageway to the other pressure chamber, said passageways being adapted to be connected to a source of air under pressure, means for transmitting a pressure differential in said pressure chambers due to unequal spacing of said discs from said outlets to said valve-positioning means, and means for transmitting the position of said valve-positioning means to said means for moving said discs in accordance with movements of said float, said float being independent of the operation of both of said transmitting means and positioned by changes in the liquid level to be maintained.

5. Apparatus for maintaining the liquid level in a basin substantially at a predetermined elevation, said basin having liquid inlet means and liquid outlet means, and a valve having a movable stem controlling flow through said inlet means, comprising a float in said basin having a stem provided with a collar, a lever resting with one end on said collar, a bell crank linked to said lever intermediate its ends, a first and a second air passageway, the weight of said float and of the load thereon being equal to the buoyancy effect on said float by the liquid whose level is to be maintained constant, each air passageway having a constrictive outlet, a rod fixed intermediate its ends to said bell crank, a first and a second valve disc adjustably mounted on said rod on opposite sides of, and normally adjacent and equally spaced from, the constrictive outlets of said first and said second air passageways, respectively, said air passageways being adapted to be connected to a source of air under pressure, an air motor having opposed pressure chambers, said first air passageway being connected to one of said pressure chambers, said second air passageway being connected to the other of said pressure chambers, a piston sealed to each of said pressure chambers, a rack rigidly connecting said pistons, and a second bell crank having one arm formed as a toothed sector which meshes with said rack, and its other pivotally linked to the free end of said lever and to said valve stem.

6. A liquid level controller for maintaining the liquid level in a basin substantially constant, said basin having liquid inlet means and liquid outlet means, a valve controlling flow through said inlet means, and a fluid pressure operated piston for positioning said valve, said controller comprising a float in said basin, a first and a second air passageway, said passageways having opposed constrictive outlets, a valve disc for each of said outlets, means rigidly connecting said valve discs, means for transmitting the movement of said float due to change in liquid level in said basin to said valve disc connecting means, an air motor having opposed pressure chambers, said first passageway being connected to one of said pressure chambers and said second passageway to the other pressure chamber, said passageways being adapted to be connected to a source of air under pressure, means for regulating the flow of pressure fluid to and from opposite sides of said piston from a pressure difference in said pressure chambers, and transmission means for transmitting the position of said fluid operated piston to said means for transmitting the movement of said float to said valve disc connecting means, said float being independent of the operation of said transmission means and positioned solely by changes in the liquid level in said basin.

7. A liquid level controller for a basin having liquid inlet means and liquid outlet means, and a valve controlling flow through said inlet means and having a valve-positioning element, comprising a float in said basin, a first and second air passageway, said passageways having opposed constrictive outlets, a valve disc for each of said outlets, means rigidly connecting said valve discs, linkage between said float and said connecting means whereby upon movement of said float due to change in liquid level in said basin a corresponding movement is imparted to said valve disc connecting means, an air motor having opposed pressure chambers, said first passageway being connected to one of said pressure chambers and said second passageway to the other pressure chamber, said passageways being adapted to be connected to a source of air under pressure, means for positioning of said valve-positioning element in accordance with pressure differentials in said pressure chambers, an air escapement valve comprising a compartment having an open end, a diaphragm across said open end, said compartment having air inlet means adapted to be connected to a source of air under pressure, a nozzle affixed to said diaphragm and having an outlet outside said compartment and an inlet in communication with said compartment, means for applying to said diaphragm a mechanical force varying with the position of said valve-positioning element in opposition to the force acting on said diaphragm due to air pressure in said compartment, means in said compartment normally permitting free flow of air from said compartment through said nozzle but restricting said flow when said mechanical force exceeds said force due to air pressure, and means for transmitting the pressure in said compartment to said linkage, said float being independent of the operation of said transmitting means and positioned solely by changes in the liquid level in said basin.

8. A device for converting a mechanical force to a corresponding gas pressure comprising a casing open at one end and a diaphragm across said open end, inlet means for gas under pressure into said casing, said casing having a central raised portion, a nozzle affixed to, and movable with, said diaphragm and having a gas outlet outside said casing and a gas inlet in communication with said casing and normally spaced from said raised portion, and means for applying a mechanical force to said diaphragm opposing the force on said diaphragm due to gas pressure in said casing to vary the gap between said nozzle inlet and said raised portion.

9. A liquid level controller for a basin having liquid inlet means and liquid outlet means, and a valve controlling flow through said inlet means and having a valve-positioning element, comprising a float in said basin, a first and a second air passageway, said passageways having opposed constrictive outlets, a pair of valve discs mounted adjacent said outlets and being rigidly connected, means including a lever pivotably supported with one end from said float for transmitting the movement of said float due to change in liquid level in said basin to said valve discs, an air motor having opposed pressure chambers, said first passageway being connected to one of said pressure chambers and said second passageway to the other pressure chamber, said passageways being adapted to be connected to a source of air under pressure, means for transmitting the pressure differential in said pressure chambers to said valve-positioning element, a device including an air pressure chamber having a movable wall, a push rod connected to, and movable with, said wall outside said chamber, means for converting the varying positions of said valve-positioning element to corresponding air pressures and for transmitting said air pressures to said air pressure chamber to move said push rod, and means for transmitting the movement of said push rod to said means for transmitting the movement of said float to the other end of said lever.

10. Apparatus for maintaining a substantially constant liquid level in a basin having inlet means and outlet means, and a valve controlling flow through said inlet means and having a valve-positioning element, comprising a float in said basin, an air motor having opposed pressure chambers, means adapted to supply air under pressure to said pressure chambers, means for regulating the air pressure in said pressure chambers from the movement of said float, means for transmitting the pressure differential in said pressure chambers to said valve-positioning element, and reset means comprising an air escapement valve including a casing having an open end, a diaphragm across said open end, said casing having air inlet means adapted to be connected to a source of air under pressure, a nozzle for flow of air from said compartment, said nozzle having a inlet in communication with said casing and an outlet outside said casing, means for varying the flow through said nozzle in accordance with the position of said valve-positioning element, a device including an air pressure chamber having a movable wall, a push rod connected to, and movable with, said wall outside said chamber, means for transmitting the air pressure in said casing to said air pressure chamber to move said push rod, and means for transmitting the movement of said push rod to said regulating means, said float being independent of said reset means and positioned solely by changes in said liquid level.

11. A device for converting a mechanical force to a corresponding gas pressure comprising a casing open at one end a diaphragm across said open end, inlet means for gas under pressure into said casing, a nozzle affixed to, and movable with, said diaphragm and having a gas outlet outside said casing and a gas inlet in communication with said casing, means for applying a mechanical force to said diaphragm opposing the force on said diaphragm due to gas pressure in said casing, and means in said casing regulating flow of air through said nozzle, said regulating means, while said forces are balanced, being spaced from said nozzle inlet a distance such that gas entering said casing escapes through said nozzle at the rate at which it enters, but restricting the flow of gas through said nozzle when the mechanical force exceeds said force due to gas pressure, and increasing said flow when the force due to gas pressure exceeds said mechanical force.

12. A device for converting the movement of a reciprocable member to a corresponding gas pressure, comprising a lever pivotally supported intermediate its ends from, and movable with, said reciprocable member, a bell crank pivotable about a fixed pivot point, a rotatable member mounted on one end of said lever and engaging one arm of said bell crank, a spring connected to the other end of said lever and urging said lever to swing about its pivot point to press said member against said bell crank arm, a casing open at one end, a diaphragm across said open end, an inlet for gas under pressure into said casing, a nozzle affixed to, and movable with, said diaphragm, said nozzle having an inlet communicating with said casing and an outlet outside said casing, and stationary means in said casing normally spaced from said nozzle inlet a distance such that gas entering said casing escapes through said nozzle at the rate at which it enters, said diaphragm due to air pressure in said casing transmitting a force to the other arm of said bell crank, said force on the other arm of the bell crank producing a moment equal and opposite to the moment due to said member pressing against said one bell crank arm.

13. A device for converting the movement of the piston of a hydraulic cylinder to a corresponding gas pressure, comprising a support arm affixed to, and moving with, the tail rod of said piston, a lever pivotably supported from said support arm intermediate its ends, a bell crank pivotable about a fixed pivot point, a rotatable member mounted on one end of said lever and engaging one arm of said bell crank, a spring connected to the other end of said lever and urging said lever to swing about its pivot point to press said rotatable member against said bell crank arm, means for adjusting the force of said spring, a casing open at one end and a diaphragm across said open end, an inlet for gas under pressure into said casing, a nozzle affixed to, and movable with, said diaphragm, said nozzle having an inlet communicating with said casing and an outlet outside said casing, and stationary means in said casing, normally spaced from said nozzle inlet a distance such that gas entering said casing escapes through said nozzle at the rate at which it enters, said diaphragm due to air pressure in said casing transmitting a force to the other arm of said bell crank, said force on the other arm of the bell crank producing a moment equal and opposite to the moment due to said member pressing against said one bell crank arm.

14. Apparatus for maintaining a substantially constant liquid level in a basin having inlet means and outlet means, and a valve controlling flow through said inlet means and having a reciprocable valve-positioning element, comprising a float in said basin, an air motor having opposed pressure chambers, means adapted to supply air under pressure to said pressure chambers, means operated by movement of said float and regulating the air pressure in said pressure chambers, means for positioning said valve-positioning element in accordance with a pressure differential in said pressure chambers, a lever pivotally supported intermediate its ends from, and movable with, said valve-positioning element, a bell crank pivotable about a fixed pivot point, a rotatable member mounted on one end of said lever and engaging one arm of said bell crank, a spring connected to the other end of said lever and urging said lever to swing about its pivot point to press said member against said bell crank arm, a casing open at one end, a diaphragm across said open end, an inlet for gas under pressure into said casing, a nozzle affixed to, and movable with, said diaphragm, said nozzle having an inlet communicating with said casing and an outlet outside said casing, stationary means in said casing spaced at equilibrium from said nozzle inlet a distance such that gas entering said casing escapes through said nozzle at the rate at which it enters, said diaphragm due to air pressure in said casing transmitting a force to the other arm of said bell crank, said force on the other arm of the bell crank producing a moment equal and opposite to the moment due to said member pressing against said one bell crank arm, and transmission means for transmitting the pressure in said casing to said float-operated means for regulating the air pressure in said pressure chambers, said float being independent of the operation of said transmission means and positioned solely by changes in the liquid level in said basin.

15. In an apparatus for maintaining a condition substantially constant at a predetermined value, said apparatus including a member whose position controls said condition and an element responsive to, and positionable in accordance with, changes in the value of said condition, pressure responsive motor means, means for applying fluid pressures to opposite sides of said motor means, means for regulating said pressures from the movements of said element, said pressures being equal when said regulating means is in its equilibrium position, and transmission means operable upon an unbalance of said pressures due to movement of said element in response to a change in the value of said condition to move said member and said regulating means in accordance with the difference in said pressures acting on said motor means, said element being independent of the operation of said transmission means and positioned solely by changes in the value of said condition.

16. Apparatus for maintaining a condition substantially constant, comprising a first member whose position controls said condition, means for positioning said first member, a second member that moves in response to changes in the value of said condition, a first and a second air passageway, said passageways having constrictive outlets and being adapted to be connected to a source of air under pressure, a pair of discs mounted adjacent said outlets, said discs being connected to move in unison in such manner that one disc moves toward its outlet while the other moves away from its outlet, means for transmitting the movement of said second member due to a change in said condition to said discs, an air motor having opposed pressure chambers, said first passageway being connected to one of said chambers and said second passageway to the other chamber, transmission means operable to transmit a pressure differential in said pressure chambers due to unequal spacing of said discs from said outlets to said first member positioning means, and means for resetting said means that transmit the movement of said second member to neutral position, said second member being independent of the operation of said transmission means and positioned solely by changes in the value of said condition.

17. Apparatus for maintaining a condition substantially constant comprising a member whose position controls said condition, means for positioning said member, an element responsive to, and positioned in accordance with, changes in the value of said condition, a first air passageway and a second air passageway, said passageways having opposed constrictive outlets and being adapted to be connected to a source of air under pressure, a pair of valve discs mounted adjacent said outlets and being rigidly connected, means for regulating the position of said valve discs in accordance with the position of said element, an air motor having opposed pressure chambers, each of said pressure chambers having a flexible wall, a piston fixed to each of said flexible walls, said first passageway being connected to one of said pressure chambers and said second passageway to the other pressure chamber, and transmission means for transmitting the movement of said pistons to said member positioning means, and for resetting said regulating means to neutral position, said element being independent of the operation of said transmission means and positioned solely by changes in the value of said condition.

18. Apparatus for maintaining a substantially constant liquid level in a basin having inlet means and outlet means, and a valve controlling flow through said inlet means and having a valve positioning element, comprising liquid level responsive means in said basin, pressure responsive motor means, means for applying fluid pressures to opposite sides of said motor means, means for regulating said pressures from the movement of said liquid level responsive means, said pressures being equal when said regulating means is in its equilibrium position, and transmission means operable upon an unbalance of said pressures due to movement of said liquid level responsive means to move said valve positioning element and said regulating means in accordance with the difference in said pressures acting on said motor means, said liquid level responsive means being independent of the operation of said transmission means and positioned solely by changes in the liquid level in said basin.

19. A device for converting a mechanical force to a corresponding gas pressure comprising a casing having an opening at one end and a diaphragm across said opening inlet means for gas under pressure into said casing, means for applying a mechanical force to said diaphragm opposing the force on said diaphragm due to gas pressure in said casing, a nozzle having a port for the outflow of gas outside said casing and a port for the inflow of gas in communication with said casing, and means adjacent one of said ports and regulating flow of air through said nozzle, said regulating means, while said forces are balanced, being spaced from said one port a distance such that gas entering said casing escapes through said nozzle at the rate at which it enters, but restricting the flow of gas through said nozzle when the mechanical force exceeds said force due to gas pressure, and increasing said flow when the force due to gas pressure exceeds said mechanical force.

References Cited in the file of this patent

UNITED STATES PATENTS

| 987,048 | Connet | Mar. 14, 1911 |
| 1,695,471 | Roucka | Dec. 18, 1928 |
| 2,517,718 | Sall | Aug. 8, 1950 |

UNITED STATES PATENT OFFICE

CERTIFICATE OF CORRECTION

Patent No. 2,867,233January 6, 1959

Samuel L. Adelson

It is hereby certified that error appears in the printed specification of the above numbered patent requiring correction and that the said Letters Patent should read as corrected below.

Column 3, line 30, for "piston" read -- pistons --; column 8, line 35, for "pasageway" read -- passageway --; column 9, line 26, after "positioned" insert -- solely --; column 11, line 19, for "a inlet" read -- an inlet --; line 33, after "end", first occurrence, insert -- and --; column 14, line 22, for the syllable and word "ing inlet" read -- ing, inlet --.

Signed and sealed this 9th day of June 1959.

(SEAL)
Attest:

KARL H. AXLINE
Attesting Officer

ROBERT C. WATSON
Commissioner of Patents